(12) United States Patent
Schaefer et al.

(10) Patent No.: US 8,739,694 B2
(45) Date of Patent: Jun. 3, 2014

(54) DYNAMIC CONTROL SYSTEM AND METHOD FOR CONTROLLED ATMOSPHERE ROOM

(75) Inventors: James C. Schaefer, Rockford, MI (US); David J. Bishop, Crowborough (GB)

(73) Assignee: James C. Schaefer, Rockford, MI (US)

( * ) Notice: Subject to any disclaimer, the term of this patent is extended or adjusted under 35 U.S.C. 154(b) by 674 days.

(21) Appl. No.: 12/911,799

(22) Filed: Oct. 26, 2010

(65) Prior Publication Data

US 2012/0097050 A1    Apr. 26, 2012

(51) Int. Cl.
*A01J 11/04*    (2006.01)
*A01J 13/00*    (2006.01)
*A01J 15/14*    (2006.01)
*A01J 11/00*    (2006.01)

(52) U.S. Cl.
USPC .............................................. 99/468; 99/467

(58) Field of Classification Search
USPC ............. 99/468, 473, 474; 700/214; 95/3, 26, 95/159, 171; 96/19; 426/312
See application file for complete search history.

(56) References Cited

U.S. PATENT DOCUMENTS 5,791,236 A * 8/1998 Schouten ........................ 99/468
2005/0235658 A1* 10/2005 Fleming et al. .................... 62/78
2007/0144638 A1* 6/2007 Fernandez et al. ............ 149/115

* cited by examiner

*Primary Examiner* — Dana Ross
*Assistant Examiner* — Lindsey C Teaters
(74) *Attorney, Agent, or Firm* — Warner Norcross & Judd LLP

(57) ABSTRACT

A control system for a controlled atmosphere room ("CA room") for storing perishable commodities, such as fruits and vegetables. The control system includes an enclosure that can be placed within the CA room to store a representative sample of the commodities in the CA room. The control system includes an atmosphere valve selectively operable to provide atmospheric communication between the enclosure and the CA room or to isolate the enclosure from the CA room. The control system includes a sampling control system for determining a dynamic control value based on the isolated representative sample. The dynamic control value may be determined by monitoring the respiratory quotient in the enclosure while it is isolated. Once determined, the control system can use the dynamic control value to adjust the atmosphere of the CA room, thereby using tests on a representative sample to control the atmosphere for the full volume of commodities in the CA room. When not testing, the enclosure generally remains in atmospheric communication with the CA room, which improves the correlation of the representative sample with the commodities in the CA room.

20 Claims, 5 Drawing Sheets

DYNAMIC CONTROL SYSTEM AND METHOD FOR CONTROLLED ATMOSPHERE ROOM

BACKGROUND OF THE INVENTION

The present invention relates to controlled atmosphere rooms (CA rooms), and more particularly to monitor and control systems for CA rooms.

Perishable items, such as post-harvest fruits and vegetables, are often stored in a gastight storage facilities. The atmosphere in even a gastight storage space will vary over time as a result of various factors. One of the more important factors affecting atmosphere is fruit respiration. Fruit respiration can have a significant affect on the oxygen and carbon dioxide levels in a storage room. Fruit respiration is the natural ripening process that occurs in fruits and vegetable after harvest. Respiration is the uptake of oxygen and the discharge of carbon dioxide just like the human body would do while breathing. The post-harvest life of fruits and vegetable life can be prolonged for an extended marketing period when placed in gastight refrigerated storage rooms. Normal respiration would reduce the oxygen in the space and also elevate the carbon dioxide. Electronic analyzers are used to indicate the levels of the atmosphere in order for the operator to manage to a safe level to keep the fruit alive.

To provide improved storage, post-harvest commodities are often stored in controlled atmosphere rooms ("CA rooms") where factors, such as temperature and atmospheric composition, can be controlled to extend the life of the items. CA rooms typically include systems for monitoring and controlling temperature and atmospheric conditions (e.g. oxygen, carbon dioxide and nitrogen levels) in a gastight space. The atmospheric control systems often operate by repeatedly sampling gas levels within the CA room and adding or removing gases to maintain the atmosphere at one or more desired setpoints. The setpoints are generally predetermined using knowledge gained from previous experience with the stored commodities. For example, a set of oxygen setpoints may be developed for a specific fruit to allow the system to adjust the oxygen levels in the atmosphere to follow a predetermined profile over time. Although past experience provides a good approximation, there are variations in commodities from year to year. These variations are typically significant enough that predetermined set points do not necessarily provide optimal control in all situations.

To address the potential limitations of predetermined setpoints, some CA rooms include a control system that operates to provide a dynamic controlled atmosphere ("DCA"). In the broadest sense, DCA technology provides a mechanism for dynamically monitoring and controlling the atmosphere in a CA room based not on predetermined setpoints, but rather on information derived on the fly through monitoring the response of the commodities to environmental changes. For example, the DCA control system may be configured to systematically change the absolute minimum level of oxygen in a gastight space available for the fruit in an effort to maintain just enough oxygen in the atmosphere for the commodities to stay alive. A reiterative process is beneficial because the minimum acceptable level will be ever changing over time depending on variety, age, temperature, etc. By dynamically maintaining minimal oxygen, the best postharvest life cycle of the stored commodity can be obtained.

The response of the stored commodity to changes can be determined by measuring characteristics affected by metabolic processes, such as ethanol production, chlorophyll fluorescence and respiration. Accordingly, DCA control methods may, for example, involve tests indicative of ethanol production, chlorophyll fluorescence and respiration. One way to understand the response of fruits and vegetables is to monitor the Respiration Quotient ("RQ") as atmospheric changes are implemented by the DCA control system. The RQ is a number calculated from the actual change of oxygen and carbon dioxide in the gastight space. Normal natural respiration will reduce the oxygen and the carbon dioxide emitting from the fruit will raise the carbon dioxide in the space. Measuring RQ can be difficult in many CA rooms due to uncertainty of gastightness of the space and the adding of N2 gas to reduce oxygen or the removal of CO2 gas by outside scrubbers, which are normal processes of associated with running many CA rooms. The addition of outside influence gas will skew the natural respiration atmosphere shifting the true RQ.

SUMMARY OF THE INVENTION

The present invention provides a control system for use in a controlled atmosphere room ("CA room") for storing perishable commodities, such as fruits and vegetables, in a controlled environment, such as a low oxygen environment. The control system includes an enclosure that can be placed within the CA room to store a representative sample of the commodities in the CA room. The enclosure can share the atmosphere of the CA room or can be selectively isolated from the remainder of the CA room in a gastight manner. Once isolated, testing on the representative sample in the enclosure can be carried out without risk to the commodities in the CA room. The results of the tests performed on the isolated sample can be used to provide a dynamically controlled atmosphere for the entire CA room. When not testing, the enclosure can be opened to the CA room so that it shares the atmosphere of the CA room, which improves the correlation of the representative sample with the commodities in the CA room.

In one embodiment, the CA room and the enclosure share a single set of analyzers that can be used to alternately monitor the atmosphere in the CA room or in the enclosure. In one embodiment, the control system alternately supplies the atmosphere from the internal space or from the CA room to the analyzers. The control system may include auxiliary supply and return lines joining the interior of the enclosure to the analyzers. The supply and return lines may include valves for selectively opening and closing the lines depending on whether atmosphere from the CA room or the enclosure is to be tested.

In one embodiment, the system is configured to dynamically maintain the CA room at the lowest possible O2 level that will maintain normal respiration in the stored commodities. For example, in one embodiment, the system monitors the respiratory quotient ("RQ") of the perishables to provide dynamic control. The RQ quotient is the ratio of the volume of carbon dioxide released to the volume of oxygen consumed by the commodities in a given period. The control system may include an oxygen analyzer and a carbon dioxide analyzer for this purpose.

In one embodiment, the system includes a high capacity valve that can be opened and closed to selectively isolate the atmosphere in the enclosure from the remainder of the CA room. The valve may be closed to isolate the interior of the enclosure to permit isolated testing on the representative sample in the enclosure. The valve may be opened to allow the atmosphere in the enclosure to equalize with the atmosphere in the CA room. The valve may be motorized and its operation may be controlled by a computer to automate the system. If desired, the control system may include a fan or blower to move air and facilitate more rapid equalization.

In one embodiment, the present invention provides a DCA method that employs a selectively isolatable sample lot to perform testing for use in determining control parameters. The method of this embodiment generally includes the steps of: (a) disposing an enclosure in a CA room; (b) disposing a sample lot in the enclosure; (c) isolating the interior of the enclosure from the atmosphere in the CA room; (d) performing testing on the sample lot within the enclosure to determine appropriate DCA control parameters; (e) adjusting the atmosphere in the CA room based in accordance with the determined control parameters; and (f) opening the interior of the enclosure to the atmosphere in the CA room. Steps (c)-(f) may be repeated periodically. In one embodiment, the step of performing testing includes the steps of allowing the atmosphere in the internal space to change through respiration and monitoring the RQ of the sample lot in response to the changes. The step of adjusting the atmosphere in the CA room may include adjusting the amount of oxygen in the CA room atmosphere.

The present invention provides a simple and effective system for improving storage of perishable commodities, such as fruits and vegetables. In use, the enclosure may be operated to selectively provide a gastight seal around the sample lot of fruits and/or vegetables to allow isolated testing of the sample lot. For example, the enclosure may be closed at selected intervals to isolate the sample lot from outside gases to allow RQ testing of the sample and not the entire CA room. By closing the valve on the enclosure, the enclosure provides a small isolated representative lot to test without the risk or difficulty of trying to manage the RQ of the entire gastight space. Moving the valves closed on the pod isolates the sample fruit from the entire storage room of fruit. This separate space within the enclosure can be more manageable and offer less risk than subjecting the entire lot of stored commodities to potentially damaging environmental conditions. If repeat testing shows that the RQ is safe, the entire storage room can be taken to that tested level. Once the levels match, the valves can open allowing the enclosure atmosphere to match the entire room. This allows the sample lot to remain in substantial correlation with the commodities in the CA room. Days or weeks (or some other period of time) later, the valves can close and testing of an even lower oxygen level and RQ's can be tested. The risk is only the sample in the pod. The present invention offers a testing enclosure suitable for not just RQ testing, but also essentially any DCA methods, such as ethanol accumulation and chlorophyll fluorescence. Information attained from the sample in the enclosure can give the operator information and reassurance before moving the atmosphere lower in the entire gastight space. Repeating the process and acquiring new test results periodically give the optimum DCA attainable.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DESCRIPTION OF THE CURRENT EMBODIMENT

Figure 1:
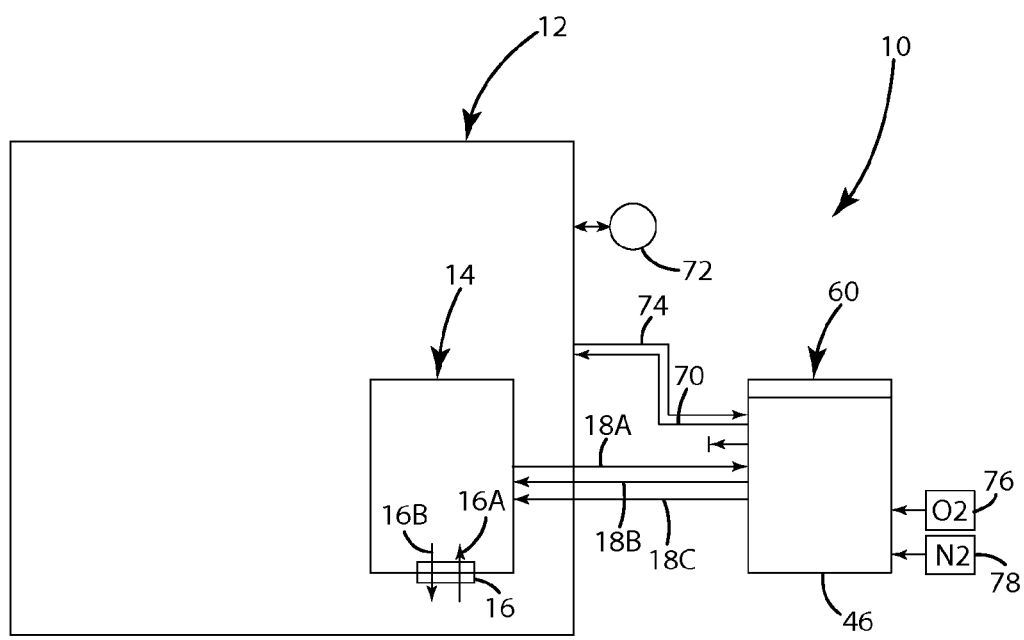
FIG. 1 is a schematic representation of a control system in accordance with an embodiment of the present invention.
Figure 3:
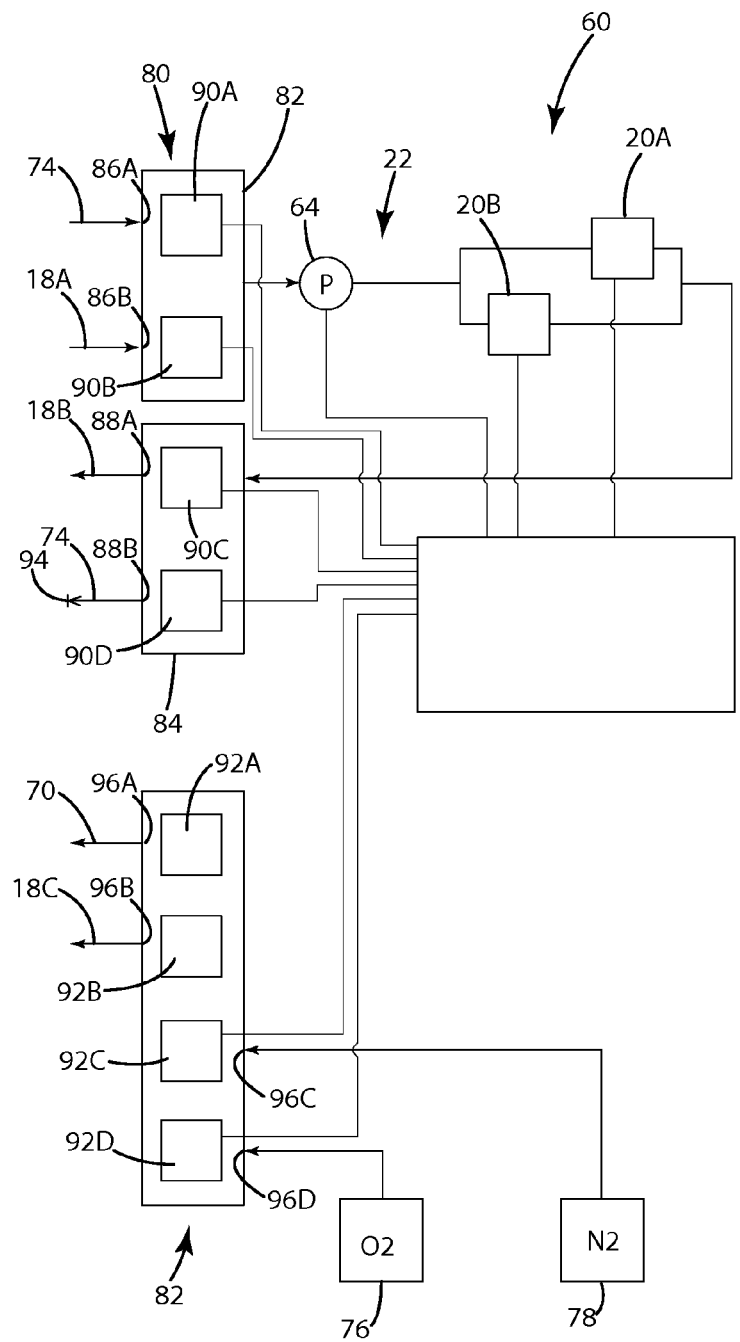
FIG. 3 is a block diagram of the control system.

A control system in accordance with an embodiment of the present invention is shown in FIG. 1. The control system 10 is configured for use in connection with a controlled atmosphere room 12 ("CA room"). The system 10 generally includes an enclosure 14, an atmosphere valve 16, sample lines 18a-b and a controller 60. The enclosure 14 is of sufficient size to hold a sample lot of the commodities in the CA room 12. The atmosphere valve 16 is a large capacity valve that is movable between an open position in which the interior of the enclosure 14 is in atmospheric communication with the interior of the CA room 12 and a closed position in which the interior of the enclosure 14 is isolated from the interior of the CA room 12. In this embodiment, the system 10 is operated by the controller 60. As perhaps best shown in FIG. 3, the controller 60 includes a sampling system 22 that includes oxygen and carbon dioxide analyzers 20a-b capable of determining the oxygen and carbon dioxide levels in a gas. The controller 60 operates the sampling control system 22 to selectively supply atmosphere from the interior of the enclosure 14 or from the interior of the CA room 12 to the analyzers. The sample lines 18a-b of the enclosure are coupled to the sampling control system 22 so that the analyzers 20a-b can, when desired, be used to sense the oxygen and carbon dioxide levels in the atmosphere of the enclosure 14. In use, the enclosure 14 is ordinarily maintained in atmospheric communication with the CA room so that the sample lot shares environmental conditions with and remains in substantial correlation with the commodities in the CA room. However, at select times, the enclosure 14 is isolated from the CA room and is subjected to isolated testing to determine whether changes in the atmosphere might be appropriate. Because the tests are performed on the sample lot in isolation from the commodities in the CA room, the testing does not present a risk the commodities in the CA room. If testing on the sample lot suggests a change in the atmosphere that is tolerable by the commodity, the change may be implemented in the entire CA room. Once the testing is completed, the enclosure 14 can again be brought into atmospheric communication with the CA room to help the sample lot remain in substantial correlation with the commodities in the CA room.

The present invention is described in connection with a control system 10 that is integrated into a CA room 12. The present invention is well-suited for use in essentially any gastight (or substantially gastight) space, and the term "CA room" is intended to broadly encompass any gastight (or substantially gastight) space used in the storage of perishable commodities, such as fruits and vegetables.

The present invention is described in connection with an embodiment that uses the results of respiratory quotient testing ("RQ testing") to dynamically control the atmosphere in the enclosure and in the CA room. The present invention may, however, be used with other DCA methodologies, such as ethanol accumulation and chlorophyll fluorescence. Alternative DCA methodologies may require the incorporation of alternative or additional sensors/analyzers, such as ethanol sensors and/or chlorophyll fluorescence sensors.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to packages of any specific orientation(s).

As noted above, the present invention relates to a control system 10 for use with a CA room 12 (e.g. gastight storage space) for perishable commodities, such as fruits and vegetables. The control system 10 generally includes an enclosure 14, an atmosphere valve 16, sample lines 18a-b and a controller 60. The enclosure 14 may be essentially any enclosure capable of providing a gastight chamber of sufficient size to hold a sample lot of the commodities in the CA room 12. The size of the enclosure may vary from application to application. Typically, it will be desirable for the enclosure to be of sufficient size to hold a representative lot of the commodities, but not substantially larger than necessary. In some application, the size of the enclosure may vary with the size of the CA room in which it is to be used and/or with the types of commodities that will be stored in the CA room.

Figure 2:
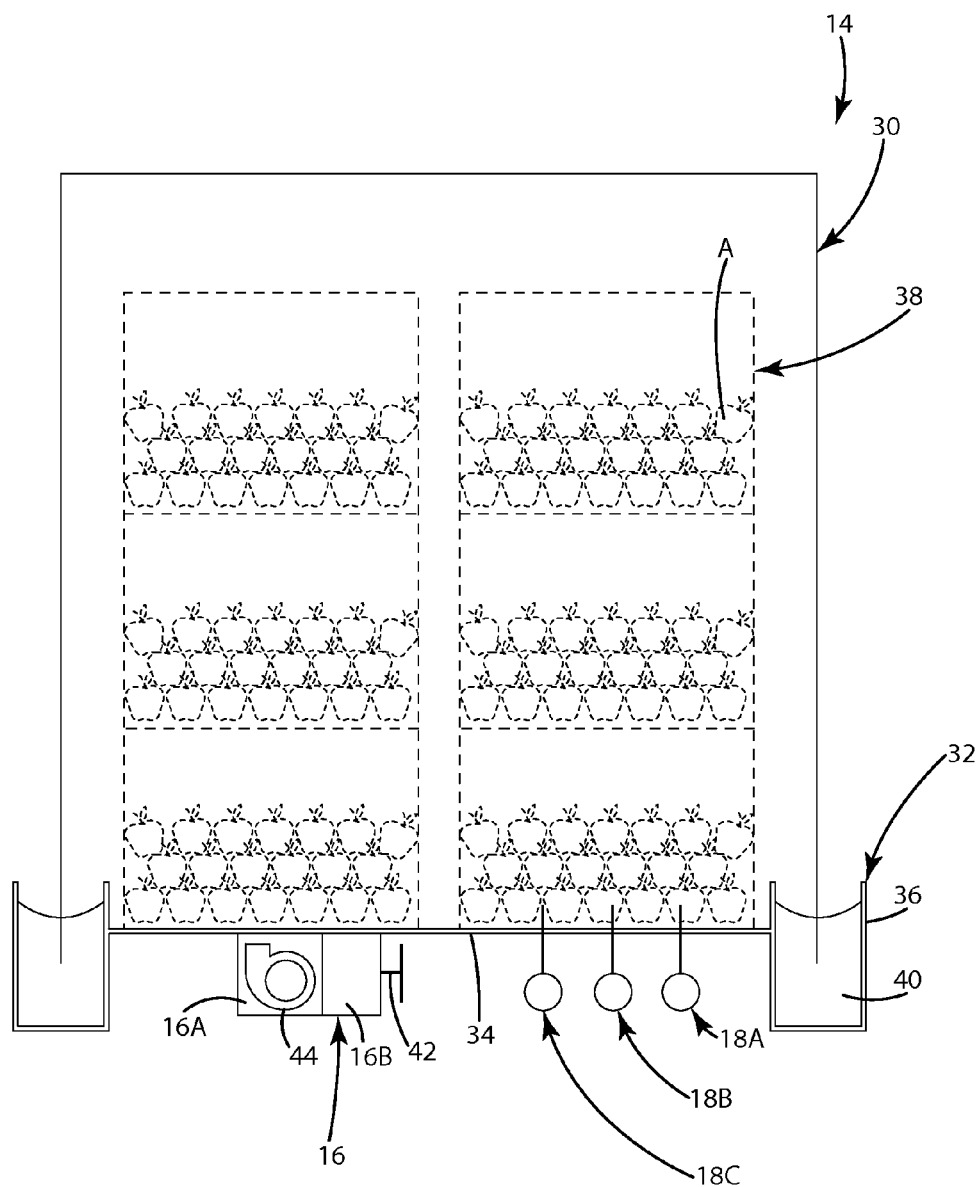
FIG. 2 is a schematic representation of an enclosure in accordance with an embodiment of the present invention.

Referring now to FIG. 2, the enclosure 14 of the illustrated embodiment includes a shroud 30 and a base 32. The shroud 30 of the illustrated embodiment is a generally square-shaped box that is closed on all sides except the bottom. The size, shape and configuration of the shroud 30 may vary from application to application as desired. The size of the shroud 30 may be selected based on the volume of space desired to house the expected representative samples. A smaller enclosure may facilitate operation because it provides a smaller volume of atmosphere that is adjustable more rapidly than a larger volume of atmosphere. For example, with less atmosphere in the enclosure 14, natural respiration of the commodities or the introduction of outside influence gases will be able to more quickly produce changes in the O2 level of the enclosure. In some applications, it may be desirable to provide different size shrouds 30 that can be alternatively used depending on the volume occupied by the representative sample.

The base 32 of the illustrated embodiment is generally rectangular and includes a floor 34 and a sealing trough 36 extending around the periphery of the floor 34. The size, shape and configuration of the base 32 may vary from application to application. The illustrated floor 34 is generally planar providing a surface suitable for supporting containers holding the representative sample. For example, the representative sample may include selections of fruits and/or vegetables contained in one or more totes that can be placed on the base 32, such as apples contained in totes 38 as shown in FIG. 1. The enclosure 14 may alternatively or in addition include integrated shelving or bins for storing the commodities. The sealing trough 36 is shaped to correspond with the shape of the bottom of the shroud 30 so that the shroud 30 can be placed in the trough 36. The trough 36 contains a sealing medium 40 that receives the shroud 30 and creates a gastight seal between the shroud 30 and the base 32. The sealing medium 40 may be water or essentially any other material suitable for creating an adequate gastight seal. The type of sealing arrangement may vary from application to application as desires. For example, the enclosure may alternatively include a door (not shown) and a gasket (not shown) to create the seal.

As noted above, the atmosphere valve 16 is movable between an open position in which the interior of the enclosure 14 is in atmospheric communication with the interior of the CA room 12 and a closed position in which the interior of the enclosure 14 is isolated from the interior of the CA room 12. In this embodiment, the atmosphere valve 16 is a high capacity valve with an electromechanical actuator 42. For example, the atmosphere valve 16 may be a double-slide valve 16a, 16b with four inch doors and a single motor 42 that operates both slides to open and close the slides simultaneously. The atmosphere valve 16 may be a single valve or essentially any number of valves that can be opened and closed together to provide adequate atmospheric communication between the CA room 12 and the interior of the enclosure. The electromechanical actuator 42 of the illustrated embodiment facilitates automated control of the atmosphere valve 16. The electromechanical actuator may be replaced by other actuators (manual or automated). In the illustrated embodiment, the atmosphere valve is mounted to the base 32. For example, as shown in FIGS. 1 and 2, the atmosphere valve 16 may be mounted to the undersurface of the base 32 and may provide an opening through the base 32 that, when open, provides atmospheric communication. It may, however, be mounted to the shroud 20. In applications with a plurality of valves, the valves may be on the shroud and/or the base 32. For example, in some applications, it may be desirable to dispose one valve at the top of the enclosure and another at the bottom of the enclosure to facilitate atmospheric pass through. The atmosphere valve 16 may also have an associated fan or blower to assist in moving atmosphere between the CA room 12 and the enclosure 14. For example, a fan 44 may be mounted in the opening of one of the two slide valves. Although not required, the fan 44 may facilitate quicker equalization between the CA room atmosphere and the enclosure atmosphere.

In the illustrated embodiment, the control system 10 is configured to integrate with the control system of the CA room 12. More specifically, a single controller 60 may be provided that operates the CA room functions and DCA control system 10. For example, the controller 60 for the CA room 12 may be programmed to control operation of the control system 10, as well as to monitor and adjust the atmosphere in the CA room 12. The controller 60 may be a GCS 610 or GCS 595 controller available from Gas Control Systems, Inc., but essentially any individual controller or plurality of controllers capable of individually or collectively providing the functionality described herein may alternatively be used.

In this embodiment, the control system of the CA room 12 includes oxygen and carbon dioxide analyzers 20a-b capable of determining the oxygen and carbon dioxide levels in a gas. In the illustrated embodiment, the analyzers 20a-b are housed within the housing of the controller 60, but that is not necessary. Although a variety of analyzers may be suitable for use in the present invention, the control system may include the GCS 250 portable analyzer or the GCS 650 analyzer, both available from Gas Control Systems, Inc. These analyzers 20a-b may be used for alternately testing the CA room atmosphere and the enclosure atmosphere. To that end, the control system 10 of the illustrated embodiment includes a sampling control system 22 that allows the system 10 to selectively supply the analyzers 20a-b with atmosphere from the interior of the enclosure 14 or from the interior of the CA room 12 to the analyzers. In operation, the sampling control system 22 operates in two different modes. When sampling from the CA room, the sampling control system 22 takes a sample of the atmosphere and wastes it to air once the testing is complete. This is not necessary, however, and it may be desirable in some applications to return CA room samples to the CA room atmosphere. When sampling from the CA room, the sampling control system 22 takes a sample of the enclosure atmosphere and returns it to the enclosure 14 after testing is complete (via sample line 18B). With the smaller volume of atmosphere in the enclosure 14, returning the sample to the enclosure 14 may help to maintain proper pressure within the enclosure 14. In some applications, it may not be necessary or desirable to return enclosure samples to the enclosure atmosphere.

The sampling control system 22 may include a pump 64 for moving atmosphere into the analyzers 20a-b. To provide a path for routing atmosphere between the enclosure 14 and the sampling control system 22, the sample lines 18a-b are coupled between the enclosure 14 and the sampling control system 22. Sample line 18a provides a flow path from the enclosure 14 to the analyzers 20a-b and sample line 18b provides a return path from the analyzers 20a-b to the enclosure. To provide a path for routing atmosphere from the CA room 12 and the sampling control system 22, a sample line 74 is coupled between the CA room and the sampling control system 22. The sample lines 18a-b may be poly tubing, copper tubing or essentially any other structure suitable for providing an atmosphere or gas flow path. In the illustrated embodiment, the sampling control system 22 includes include a sampling manifold 80 with a supply portion 82 having a plurality of inlet ports 86a-b that can be selectively coupled to an outlet that leads to the analyzers 20a-b. The sampling manifold 80 also includes return portion 84 having a plurality of outlet ports 88a-b that can be selectively coupled to the return line from the analyzers 20a-b to route the returning air. The sampling manifold includes a plurality of two-way solenoids 90a-d (or other actuators) that are selectively actuated by the controller 60 to control which supply line is coupled to the input line for the analyzers 20a-b and which return line is coupled to the output line from the analyzers 20a-b. The solenoids 90a-d may be electromechanically operated to facilitate automated operation of the system 12 by the controller 60. For example, the controller 60 may actuate the appropriate solenoids to route gas from the enclosure 14 to the analyzers 20a-b and from the analyzers 20a-b back to the enclosure 14. As another example, the controller 60 may actuate a different set of solenoids to route gas from the CA room 12 to the analyzers 20a-b and to vent to the atmosphere air returning from the analyzers 20a-b through vent 94. Although the illustrated embodiment includes oxygen and carbon dioxide analyzers that are shared between the CA room and the enclosure, separate analyzers may be provided for each environment. Also, the oxygen and carbon dioxide sensors may be replaced or supplemented with other types of sensors based on the methodology used for providing DCA, such as ethanol accumulation or chlorophyll fluorescence.

The controller 60 may also have the ability to supply one or more gas to the CA room 12 and/or the enclosure 14. More specifically, the controller 60 may have the ability to add O2 and/or N2 to the CA room atmosphere of the enclosure atmosphere. For example, if respiration causes the oxygen content in the CA room 12 or the enclosure 14 to become too low, the controller 60 may supply oxygen to the appropriate space. This may be achieved by pumping ambient air into the enclosure 14 or into the CA room 12, as appropriate. Alternatively, if the oxygen level in the enclosure 14 becomes too low, it may be possible in some applications to open the enclosure 14 to the CA room 12 to raise the oxygen level. As another example, if it is desirable to reduce the amount of oxygen in the CA room 12 or the enclosure 14, the controller 60 may introduce N2 into the appropriate space.

In the illustrated embodiment, the controller 60 is operatively coupled to a gas manifold 82 for selectively distributing gases to the CA room 12 and the enclosure 14. The illustrated embodiment includes a gas manifold 82 with a plurality of ports 96a-d and a plurality of two-way solenoids 92a-d that allow O2 or N2 to be supplied to the CA room 12 and/or the enclosure 14. For example, an O2 supply 76 and an N2 supply 78 may be connected to two different ports on the gas manifold 82. In addition, a CA room supply line 70 and an enclosure supply line 18c may be connected to two additional ports. The controller 60 may actuate the solenoids 96a-d to connect either the oxygen supply 76 or the nitrogen supply 78 to the CA room or the enclosure, thereby allowing nitrogen or oxygen to be supplied to either space. The CA room 12 and the enclosure 14 may include separate pressure exhausts 72 that allows atmosphere to vent to outside the environment if the pressure in the space exceeds a threshold or that draws in air from outside the environment if the pressure falls too low. The enclosure 14 may have a pressure exhaust (not shown) that vents to or draws from the CA room 12 or ambient air outside the CA room 12. Alternatively, with the enclosure 14, it may be desirable to have a supply line that can be used to move gas from the enclosure when additional gas is added. The gas returning from the enclosure 14 may be vented to the atmosphere.

The present invention also provides a method for monitoring and controlling the atmosphere in a gastight storage space, such as a CA room. The method includes the general steps of: (a) providing a gastight storage space for storing a volume of commodities, (b) providing a gastight enclosure with a representative sample of the commodities in the gastight storage space, (c) generally maintaining the enclosure in atmospheric communication with the gastight space, (d) periodically and temporarily isolating the atmosphere of the enclosure from the atmosphere in the gastight space, (e) determining a dynamic control value based on the representative sample in isolation from the commodities in the gastight space, (f) adjusting the atmosphere of the gastight space as a function of the dynamic control value determined from the isolated sample and (g) returning the enclosure to atmospheric communication with the gastight space. This method may be performed using essentially any suitable structural components. For purposes of disclosure, the method will be described in connection with the control system 10 discussed above, including CA room 12, enclosure 14 and associated components.

Figure 4:
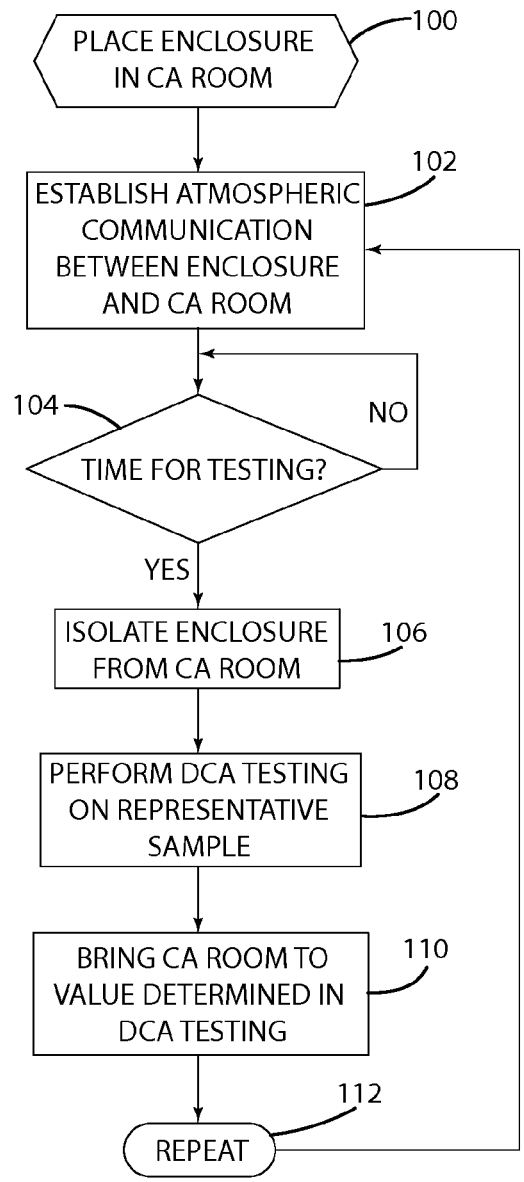
FIG. 4 is a flow chart of a method for monitoring and controlling the atmosphere in a CA room in accordance with an embodiment of the present invention.
Figure 5:
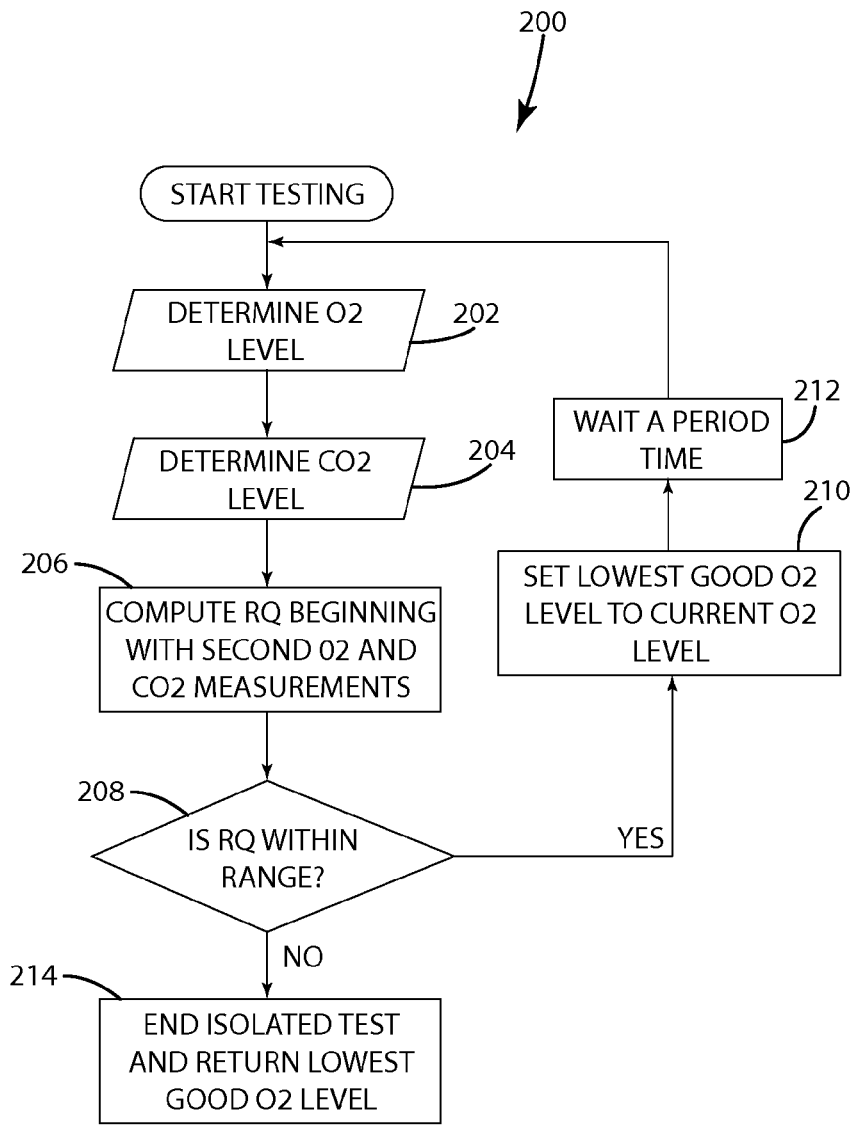
FIG. 5 is a flow chart of a DCA testing method in accordance with one embodiment of the present invention.

Referring now to FIGS. 4 and 5, the method will now be described in connection with one embodiment carried out with control system 10 described above. The enclosure 14 is removably or permanently placed 100 in the CA room 12. In the illustrated embodiment, the enclosure 14 is simply positioned in the desired location within the CA room 12. It may alternatively be built into the CA room 12. For example, the enclosure 14 may be built into a wall of the CA room 12. In some applications, the enclosure may be physically located outside the CA room and air flow paths may be established between the two spaces to allow atmospheric communication when desired.

The enclosure 14 is filled with a representative sample of the commodities in the CA room 12. The representative sample may be randomly selected from the commodities placed in the CA room 12. For example, in the context of apples, a small number of apples may be selected from each pallet of apples placed in the CA room 12. The precise number of commodities and manner of selecting a representative sample may vary from application to application.

When the CA room and enclosure are first filled with commodities, it may be desirable to establish 102 atmospheric communication between the two spaces. This may allow the commodities to settle into their respective environments and to allow the commodities in the CA room to equalize with representative sample in the enclosure. The length of initial settling/equalizing time (if any) may vary from application to application, but may be in the range of two weeks for fruit, such as apples.

The control system 10 establishes 102 atmospheric communication between the enclosure 14 and the CA room 12. The control system 10 will generally maintain atmospheric communication between the enclosure 14 and the CA room 12. This permits the representative sample to typically encounter the same atmospheric conditions as the commodities in the CA room 12, which in turn helps to maintain correlation between the representative sample and the commodities in the CA room 12. In the illustrated embodiment, the controller 60 provides atmospheric communication by opening atmosphere valve 16. This valve 16 provides a path for atmosphere to flow between the interior of the enclosure 14 and the CA room 12. As noted above, the enclosure 14 may be provided with a pump or blower, such as fan 44, for circulating air between the enclosure 14 and the CA room 12. This may be helpful in maintain uniform atmosphere in the enclosure 14 and the CA room 12. In the illustrated embodiment, the atmosphere valve 16 include an inlet 16a and an outlet 16b, and a fan 44 mounted in the inlet 16a to move air from the CA room 12 into the enclosure 14, which in turn forces air from within the enclosure 14 to flow out into the CA room 12. The fan 44 is disabled when the atmospheric valve 16 is closed. When the valve 16 is open, the fan 44 may be operated periodically as needed to provide sufficient airflow to maintain a good mixture between the CA room and the enclosure. Alternatively, the fan 44 may run continuously, for example, at a flow rate selected to provide sufficient atmospheric mixing.

The controller 60 of this embodiment is programmed to periodically isolate the enclosure 14 and perform DCA testing on the representative sample contained in the enclosure 14. The controller 60 is configured to determine when it is time for isolated testing 104. Although the timing of the isolated tests may vary, the controller 60 of the illustrated embodiment periodically performs isolated test at predetermined time intervals. To implement this approach, the controller 60 maintains the amount of time that has passed since the last isolated test and concludes that it is time for testing 104 when the predetermined time has passed. The predetermined time interval may be a regular time interval (e.g. once every fourteen days) or the timing between tests may vary of time (e.g. reducing the time interval by ten percent each time). As an alternative to using predetermined timing, the amount of time between tests may be dynamic and may vary depending on atmospheric conditions in the CA room 12 or the enclosure 14. The timing between isolated tests may vary, among other things, based on the type of commodities being stored and/or the condition of the commodities in storage.

When it is time to perform an isolated test, the controller 60 isolates 106 the enclosure 14 from the CA room 12. More specifically, the controller 60 closes atmosphere valve 16. This closes the flow path between the enclosure 14 and the CA room 12, which generally makes it easier to affect changes in the atmosphere in the enclosure 14 and protects the commodities in the CA room 12 from the atmospheric changes taking place within the enclosure 14.

Once the enclosure 14 is isolated, the controller 60 performs 108 DCA testing on the representative sample in the enclosure 14. As noted above, in the illustrated embodiment of the present invention, the control system 10 uses RQ analysis to understand the status of the representative sample and determine the lowest possible O2 level for the commodities. As noted elsewhere, the control system 10 may, alternatively, be configured to implement other DCA methodologies, such as ethanol accumulation or chlorophyll fluorescence, which may include other methods for determining the lowest possible oxygen level or methods for determining some atmospheric setpoint other than oxygen level. At this time, the representative sample continues to undergo respiration, which consumes the oxygen in the enclosure 14 and produces carbon dioxide. Because of the reduced void or ratio of unoccupied space to product in the enclosure, the representative sample should be able to consume the oxygen to the point where it affects the overall O2 and CO2 level in the enclosure 14 more quickly than the respiration in the CA room 13. While the enclosure 14 is in isolation, the sampling control system 22 periodically takes samples of the enclosure 14 atmosphere to determine the status of the representative sample. More specifically, the sampling control system 22 actuates the appropriate solenoids 90a-d to open a flow path from the enclosure 14 to the analyzers 20a-b. The sampling pump 64 is activated to move atmosphere from the enclosure 14 to the analyzers 20a-b. Both supply and return lines, 18a and 18b, are open so that gas is returned to the enclosure 14. The sampling pump 64 is run for a sufficient period of time to ensure that atmosphere from the enclosure 14 has moved to the analyzers 20a-b and the analyzers 20a-b have settled on an accurate reading.

The control system 10 of this embodiment attempts to maintain the commodities in the CA room 12 at the lowest possible O2 level that will sustain normal respiration. If the O2 level is higher than necessary, the commodities may undergo increased respiration and may expire more quickly. If the O2 level is too low for the commodities, the commodities may become anaerobic and cease normal respiration. As a result, the present invention helps to maintains healthy commodities while extending postharvest life. In the illustrated embodiment, the lowest possible O2 level is determined within the isolated enclosure 14 by finding the lowest O2 level at which the representation sample carries out normal respiration. The control system 10 of this embodiment uses RQ values within the enclosure 14 to assess the respiration of the representative sample (See FIG. 5). In the illustrated embodiment, the control system 10 uses a reiterative process that relies on respiration within the enclosure 14 to drive the testing. Once isolated testing starts, the controller 60 begins to repeatedly determine the RQ value in the enclosure atmosphere while the representative sample continues to consume O2 and generate CO2. Generally speaking, the controller 60 determines the RQ value by looking at the ratio of CO2 produced to O2 consumed. More specifically, the controller 60 periodically obtains a reading from the oxygen analyzer 20a to determine the O2 level, and obtains a reading from the carbon dioxide analyzer 20b to determine the CO2 level. The controller 60 computes the RQ value based on those readings. In this embodiment, the controller 60 computes 206 the RQ value as the difference between the last two CO2 readings divided by the difference between the last two O2 readings. For example, the RQ value may be determined in accordance with the following formula:

$$RQ = \frac{(Current\_CO2 - Last\_CO2)}{(Last\_O2 - Current\_O2)}$$

Given that this formula involves two sequential readings, the controller 60 may wait for the second readings before computing the RQ value. The preceding formula is merely exemplary and may be replaced by essentially any alternative formula that provides a representation of RQ.

The controller 60 determines 208 if the RQ value is within an acceptable range. With the apples of this embodiment, an RQ value between 0.9 and 1.1 is considered normal (using formula RQ presented above). This range is merely exemplary and should not be interpreted to limit the scope of the present invention. The "normal" range may vary from application to application. For example, different fruits may have different acceptable RQ ranges. As another example, the range may vary depending on the formula used to calculate the RQ value. Although the illustrated embodiment relies on respiration to reduce O2 within the enclosure 14, the O2 level may alternatively or additionally be reduced by introducing N2 via supply line 18c.

The controller 60 will maintain in memory the lowest possible O2 level that provided a normal RQ value. More specifically, the controller 60 will set the "lowest possible O2 level" variable to the current O2 level if the current O2 level yielded an RQ value that was within the acceptable range.

As long as the RQ value remains in the normal range, the system 10 will continue the process. If the RQ value is normal, the controller 60 will wait 212 before taking the next readings and computing the next RQ value. The amount of time between readings may vary from application to application depending in part on the characteristics of the commodities. However, in the illustrated embodiment, the RQ value is determined and evaluated every sixty minutes. The amount of time between readings may be predetermined or may be dynamically computed based, for example, on atmospheric conditions in the CA room 12 or the enclosure 14. The timing between successive RQ determinations may vary, among other things, based on the type of commodities being stored and/or the condition of the commodities in storage.

Once the RQ value falls outside the normal range (outside of 0.9 to 1.1 for this example), the controller 60 recognizes that the representative sample is no longer undergoing normal respiration. The amount of time required for each isolated test to reach an end may vary from application to application. For example, the testing process may run for a number of hours or a number of days. In the illustrated embodiment, the controller 60 ends 214 the isolated test and returns the lowest possible O2 level (i.e. the last O2 level that provided a normal RQ value) as soon as the RQ value falls outside the normal range for the first time. This approach is merely exemplary and different methods may be used for determining the lowest possible O2 level. For example, instead of ending the test the first time that the RQ value falls outside the normal range, the controller 60 may provide additional O2 to the enclosure and repeat the test a number of times before providing a definitive lowest possible O2 level. The lowest possible O2 level may be determined as a function of the different RQ values found in repeated tests, such as, the average result, the mean result, the highest result or the lowest result. The controller 60 may add O2 to the room by temporarily opening the atmosphere valve 16 to allow atmosphere exchange between the CA room 12 and the enclosure 14. Alternatively, if the system is configured to allow O2 to be pumped into the enclosure 14, the controller 60 may pump additional O2 (e.g. ambient air) into the enclosure 14 via supply line 18c while leaving the atmosphere valve 16 closed. As another alternative, the system 10 may determine the lowest possible O2 level by bringing the representative sample to the edge of the normal range rather than moving it outside the range.

Once the lowest possible oxygen level has been determined through the enclosure tests, the controller 60 brings 110 the atmosphere in the CA room 12 to the determined value. This may be achieved by allowing normal respiration in the CA room 12 to naturally reduce the O2 level or it may be achieved by adding gases, such as N2, to the CA room atmosphere to affect the desired change. In a typical system, the controller 60 monitors and adjusts the atmosphere in the CA room 12 to maintain specific gas levels, such as O2, CO2 and N2 levels. For example, these systems may introduce O2 or N2 to the CA room 12 as necessary to maintain the oxygen level at the desired setpoint. Once each isolated test is complete, the oxygen setpoint in the CA room 12 may be set to the returned DCA value. In some situations, it may be necessary to increase the O2 level in the CA room 12. In those situations, the controller 60 can introduce O2 (e.g. ambient air) into the CA room 12 via supply line 74.

After the oxygen level in the CA room 12 has been reduced to the minimum level determined in the enclosure testing, the process may be repeated 112 by again establishing 102 atmospheric communication between the enclosure 14 and the CA room 12, and waiting for the next time for testing 104. More specifically, the atmosphere valve 16 may be opened and the fan 44 may be operated as desired to equalize the two spaces.

As noted above, the CA room 12 and the enclosure 14 may be maintained in atmospheric communication when the enclosure 14 is not undergoing isolated test. This will help the representative sample to remain in correlation (as much as possible) with the commodities in the CA room. In the illustrated embodiment, it is likely that isolated testing will be performed once every two weeks or so. However, the period of time between isolated enclosure testing may vary from application to application depending on a variety of factors, including type of commodity, age of commodity and environmental conditions.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The embodiments of the invention in which an exclusive property or privilege is claimed are defined as follows:

1. A control system for use in a gastight storage facility containing a bulk perishable commodities comprising:
   a test enclosure disposed within the gastight storage facility defining an interior space of sufficient size to hold a representative sample of the commodities;
   an atmosphere valve selectively movable between an open position in which said interior space is in atmospheric communication with the gastight storage facility, whereby the representative sample of commodities in the interior space and the bulk of commodities in the gastight storage facility are subject to common atmospheric conditions, and a closed position in which said interior space is isolated from the gastight storage facility, whereby the representative sample of the commodities can be subjected to different atmospheric conditions than the bulk of the commodities in the gastight storage facility; and
   a controller for dynamically controlling the atmosphere in the gastight storage facility, said controller configured to control said atmosphere valve to selectively isolate said interior space from the gastight storage facility, said controller configured to determine a dynamic control value by analyzing atmosphere within said interior space while said enclosure is in isolation from said gastight storage facility, said dynamic control value derived from a response of the representative sample of commodities to changes in atmosphere within said interior space, said controller configured to control the atmosphere in the gastight storage facility as a function of said determined dynamic control value.

2. The control system of claim 1 wherein said dynamic control value is further defined as an oxygen level.

3. The control system of claim 2 wherein said controller is configured to determine said oxygen level based on a respiratory quotient of said representative sample while said sample is in isolation from the gas tight storage space.

4. The control system of claim 1 further comprising an oxygen analyzer and a carbon dioxide analyzer, said controller configured to determine said respiratory quotient based on readings from said oxygen analyzer and said carbon dioxide analyzer.

5. The control system of claim 1 further comprising a gas analyzer, said controller configured to selectively supply atmosphere from either said interior space or the gastight storage facility to said gas analyzer, whereby a single gas analyzer may be used to monitor the gastight storage facility and to determine a dynamic control value from said representative sample in said interior space.

6. The control system of claim 5 wherein said gas analyzer is further defined as an oxygen analyzer and a carbon dioxide analyzer.

7. The control system of claim 6 wherein said atmosphere valve includes an inlet valve, an outlet valve and a fan for moving atmosphere from the gastight storage facility into said interior space through said inlet valve and from said interior space to the gastight storage facility through said outlet valve.

8. The control system of claim 1 further including a supply line and a return line coupling said interior space to said controller, said controller configured to sample atmosphere from said interior space and to return said sampled atmosphere to said interior space.

9. A controlled atmosphere storage system comprising:
   a gastight storage facility of sufficient size to store a volume of perishable commodities;
   a test enclosure disposed within said gastight storage facility, said enclosure defining an interior space of sufficient size to hold a representative sample of said commodities;
   an atmosphere valve selectively movable between an open position in which said interior space is in atmospheric communication with the gastight storage facility such that the volume of perishable commodities and the sample of commodities may mature while subject to a shared atmosphere, and a closed position in which said interior space is isolated from the gastight storage facility such that test can be performed on the representative sample without impacting the volume of perishable commodities; and
   a control system for controlling the atmosphere in the gastight storage facility, said control system configured to periodically isolate said interior space from the gastight storage facility by operation of said atmosphere valve and to determine a dynamic control value from said representative sample while said representative sample is in isolation from said gastight storage facility, said dynamic control value derived from a response of the representative sample of commodities to changes in atmosphere within said interior space, said controller configured to adjust the atmosphere in the gastight storage facility as a function of said determined dynamic control value.

10. The storage system of claim 9 wherein said dynamic control value is further defined as an oxygen level, and wherein said control system is configured to determine said oxygen level based on a respiratory quotient of said representative sample while said sample is in isolation from the gas tight storage space.

11. The storage system of claim 9 further comprising a gas analyzer, said control system configured to selectively supply atmosphere from either said interior space or the gastight storage facility to said gas analyzer, whereby said gas analyzer may be used alternately to monitor the gastight storage facility or to determine said dynamic control value from said representative sample in said interior space.

12. The storage system of claim 11 wherein said gas analyzer is further defined as an oxygen analyzer and a carbon dioxide analyzer.

13. The storage system of claim 9 wherein said atmosphere valve includes an inlet valve, an outlet valve and a fan for moving atmosphere from the gastight storage facility into said interior space through said inlet valve and from said interior space to the gastight storage facility through said outlet valve.

14. The storage system of claim 9 wherein said control system includes a supply line and a return line coupling said interior space to a gas analyzer, said control system configured to sample atmosphere from said interior space with said gas analyzer and to return said sampled atmosphere to said interior space.

15. A method for dynamic control in a gastight storage space, comprising the steps of:
- providing a gastight storage space for storing a volume of commodities;
- providing a test enclosure within said gastight storage space with an interior space for storing a representative sample of the commodities;
- generally maintaining the test enclosure in atmospheric communication with the gastight space, whereby the volume of perishable commodities and the sample of commodities may mature while subject to a shared atmosphere;
- periodically and temporarily isolating the atmosphere of the test enclosure from the atmosphere in the gastight space, whereby the sample of commodities may be selectively subjected to a different atmosphere than the volume of commodities and tests can be performed on the representative sample in the different atmosphere without having the different atmosphere impact the volume of perishable commodities;
- determining a dynamic control value based on the representative sample while the atmosphere of the test enclosure is isolated from the atmosphere in the gastight space, the dynamic control value derived from a response of the representative sample of commodities to changes in atmosphere within the interior space;
- adjusting the atmosphere of the gastight storage space as a function of the dynamic control value determined from the isolated sample; and
- returning the atmosphere in the test enclosure to communication with the atmosphere in the gastight space between the periodic and temporary isolation periods, such that the representative sample remains substantially correlated with the commodities in the gastight storage space.

16. The method of claim 15 wherein said determining step is further defined as determining the lowest oxygen level that permits normal respiration in the representative sample; and
wherein said adjusting step includes bringing the oxygen level in the gastight storage space to the determined lowest oxygen level.

17. The method of claim 16 wherein said determining step is further defined as determining the lowest oxygen level that permits normal respiration in the representative sample based on the respiratory quotient of the representative sample.

18. The method of claim 17 wherein said determining step includes the steps of:
- moving a sample of gas from the enclosure to an oxygen analyzer and a carbon dioxide analyzer;
- determining an oxygen level of the sample of gas and a carbon dioxide level of the sample of gas;
- computing the respiratory quotient as a function of the determined oxygen and carbon dioxide levels; and
- returning gas to the enclosure to substantially maintain appropriate pressure in the enclosure.

19. The method of claim 18 wherein said determining step includes the step of setting the lowest possible oxygen level as the lowest oxygen level at which the representative sample returned a respiratory quotient within a predetermined range.

20. The method of claim 15 wherein said determining step is further defined as determining a dynamic control value based on ethanol accumulation or chlorophyll fluorescence in the enclosure.

* * * * *